United States Patent [19]

Hogseth et al.

[11] 4,312,676
[45] Jan. 26, 1982

[54] RETRO-REFLECTIVE LIQUID COATING COMPOSITION

[75] Inventors: John M. Hogseth; Melvin L. Johnson, both of St. Paul, Minn.

[73] Assignee: Minnesota Mining & Manufacturing Company, St. Paul, Minn.

[21] Appl. No.: 827,898

[22] Filed: Aug. 26, 1977

Related U.S. Application Data

[63] Continuation of Ser. No. 594,273, Jul. 9, 1975, abandoned, which is a continuation of Ser. No. 219,191, Jan. 19, 1972, abandoned, which is a continuation of Ser. No. 23,014, Mar. 26, 1970, abandoned.

[51] Int. Cl.$^3$ .......................... C08K 5/05; C08K 5/07; C08L 1/26; C08L 94/04
[52] U.S. Cl. .................................. 106/189; 106/193 J; 106/287.35; 260/27 R; 260/32.8 R; 260/33.4 R
[58] Field of Search ............... 106/19, 20, 193 J, 189, 106/287.35; 260/32.8 R, 38.4 R, 27 R

[56] References Cited

U.S. PATENT DOCUMENTS

| | | |
|---|---|---|
| 2,933,989 | 4/1960 | D'Adrian . |
| 2,997,403 | 8/1961 | Searight ............................ 106/193 I |
| 3,099,637 | 7/1963 | Nellessen ....................... 106/193 I X |
| 3,175,935 | 3/1965 | Vanstrum ............................. 106/288 |
| 3,228,897 | 1/1966 | Nellessen ............................ 106/193 I |
| 3,420,597 | 1/1969 | Nellessen et al. ................... 350/105 |
| 3,835,087 | 9/1974 | Searight et al. ................... 106/19 X |
| 4,004,930 | 1/1977 | Tung ..................................... 106/19 |

*Primary Examiner*—Allan Lieberman
*Attorney, Agent, or Firm*—C. Alexander; D. M. Sell; R. R. Tamte

[57] ABSTRACT

A liquid coating composition that is useful to form retro-reflective marks that actuate photoscanner sensing devices and that comprises a liquid vehicle and retro-reflective elements uniformly dispersed in the vehicle. The vehicle includes a high proportion of volatile solvent and a gel agent that gels the vehicle so that the retro-reflective elements are suspended in the vehicle. The gel agent comprises at least a large proportion of the non-volatile portion of the vehicle.

9 Claims, No Drawings

RETRO-REFLECTIVE LIQUID COATING COMPOSITION

REFERENCE TO RELATED APPLICATIONS

This application is the last of a series of continuation applications beginning with original application Ser. No. 23,014, filed Mar. 26, 1970, and including Ser. No. 219,191, filed Jan. 19, 1972, and Ser. No. 594,273, filed July 9, 1975. All of the prior applications are now abandoned.

BACKGROUND OF THE INVENTION

An advantageous method for automatically initiating processing or sorting operations on articles traveling along a conveyor is to apply retro-reflective code marks on the articles and "read" those marks with a photoscanner. The photoscanner includes a light source that sends out one or more beams of light and a photoelectric cell adjacent each beam of light that develops an electric signal whose magnitude depends on the amount of light that strikes the cell. Since retro-reflective code marks return light substantially along the line that light struck the marks, the registration of a retro-reflective code mark with a beam transmitted by the photoscanner will cause a signal of large magnitude to be developed in the cell, and the photoscanner is set so that such a signal will trigger the processing or sorting operation.

Full exploitation of photoscanning to automate processing and sorting operations has been prevented by limitations in the past methods for applying retro-reflective code marks. Retro-reflective liquid coating compositions, which comprise a liquid vehicle and transparent glass spherical beads dispersed in the vehicle as taught in U.S. Pat. Nos. 2,963,378 and 3,228,897, offer the best adaptability to automatic application, but the existing varieties of such coating compositions have other disadvantages. One major disadvantage of the prior coating compositions arises from the way in which the compositions become retro-reflective: upon application of the compositions, the glass beads are distributed as a thin layer and the vehicle recedes until the exterior beads partially protrude above the main portion of the coating and are optically exposed, though covered with a thin transparent skin of vehicle. This process takes a comparatively long time, and, as a result, marks formed from existing compositions by desired methods of application do not become sufficiently retro-reflective to trigger a photoscanner until several minutes after application.

Such a several-minute delay is intolerable in many potential applications, since it is typically desirable for a processing or sorting station on an automated line to follow the marking station quite closely. In fact, most often, articles traveling on an automated line should reach the processing or sorting station a few seconds after the marking station. Since no retro-reflective liquid coating composition has been practicably useful to form marks that are reflective in just a few seconds, such coating compositions have not been used to form retro-reflective code marks on a large percentage of lines where they could otherwise be used to automate the line.

SUMMARY OF THE INVENTION

The present invention makes possible liquid coating compositions that form marks that are instantly retro-reflective. Coating compositions of the invention may be briefly summarized as generally comprising (1) a liquid vehicle that includes
 (a) a volatile solvent that accounts for at least about 80 volume-percent of the vehicle, and
 (b) a gel agent that gels the vehicle and accounts for at least about 25 volume-percent of all non-volatile binder material present in the vehicle; and (2) retro-reflective elements dispersed in a high proportion in the vehicle and maintained in a lasting suspended condition by the gelled nature of the composition.

Since the retro-reflective elements are suspended in the vehicle of a composition of the invention, the outermost elements in an applied mark of the composition remain at the exterior surface of the applied mark as the vehicle shrinks around them. The vehicle does not flow well because of its gelled nature, but nevertheless quickly shrinks through evaporation of solvent to cause the exterior retro-reflective elements to partially protrude from the mark and be optically exposed. Since the proportion of non-volatiles in the vehicle is low, any film covering the protruding retro-reflective elements is very thin. A second or so after application, marks applied from preferred coating compositions of the invention are capable of triggering a photoscanner used in automatic processing or sorting apparatus.

Coating compositions of the invention have other advantages beside instant reflectivity. Since the compositions are gelled and therefore exhibit little flow, the composition in an applied mark does not run even when the mark is on a hard nonporous vertical surface. Because of this property, compositions of the invention can be reliably used to form multi-mark codes sensed by sets of adjacent photoelectric cells; that is, a mark of a coating composition of the invention will hold its shape and not cause a mistriggering by extension of the mark into the position for a different code mark.

Further, since retro-reflective elements in prior-art coating compositions will sink in a mound-shaped mark, prior art coating compositions are applied by coating apparatus that applies as thin a coating as possible, ideally distributing the retro-reflective elements as a monolayer. But the retro-reflective elements in compositions of the invention are maintained in suspended condition in an applied mark of the composition, and as a result the compositions may be applied by applicators more adapted to automatic marking operations. For example, compositions of the invention may be applied by applicators that propel a narrow short spurt of the composition a few inches to articles traveling on a conveyor. Another advantage of the suspended condition of the retro-reflective elements is that marks can be applied to irregular surfaces, such as to the sides of a sack or bag. In fact, coating compositions of the invention can be applied to the bottom of an article, and will quickly become retro-reflective, since a gravity-dependent flow-off of vehicles is not responsible for exposure of the retro-reflective elements.

DETAILED DESCRIPTION

The gel agent and volatile solvent in the vehicle of a coating composition of the invention are chosen in conjunction with one another so that they will form a gel that will cause the retro-reflective elements in the composition to remain in a lasting suspended condition. Preferably, for example, spherical glass beads dispersed in a composition of the invention show substantially no settling after a month of storage. The gelled coating composition is generally thixotropic, that is, becomes much less viscous when subjected to mechanical manipulating forces. Thus, coating compositions of the invention may be conveniently poured, pumped through application equipment, ejected through applicator nozzles, or brushed on an article.

A wide range of gel agents that will form the desired gel are available. In general, the gel agent is chosen from materials that when mixed in small amount with the solvent (usually less than about 10 volume parts per 100 parts of solvent) will form a gel as described. A sampling of useful gel agents includes high-molecular-weight carboxyl-terminated vinyl polymers, derivatives of methyl or ethyl cellulose, or organic derivatives of clay minerals.

Similarly, a wide range of solvents is usually available that will form a gel with a chosen gel agent. Typical useful solvents are methanol, methyl-ethyl-ketone, methyl-propyl-ketone, n-propyl acetate, ethyl acetate, toluene, heptane, ethanol, isopropanol diethyl ketone, 1,1,2-trichloroethane, and isopropyl acetate. Blends of two or more solvents are often used, especially when one solvent is used to improve gelation and another is used to speed evaporation. The faster the solvent evaporates, the more quickly will a mark of the composition reflect, and thus, in compositions that provide the fastest reflection, the solvent (or at least the major part of it) generally has an evaporation rate of at least 200 (n-butyl acetate=100), and preferably 300. Another property desired for solvents in fast-reflecting coating compositions of the invention is a low surface-tension characteristic, since that property contributes to some draining away of the vehicle from the retro-reflective elements. Despite these desired characteristics, water, which is slow-evaporating and has a rather high surface tension, is a useful solvent when instant reflection is not critical.

To obtain fast reflection the volatile solvent should constitute a high percentage of the vehicle in a coating composition of the invention so that the vehicle will quickly shrink and optically expose the retro-reflective elements. Thus, the solvent generally comprises at least 80 volume-percent, and more typically, 90 volume-percent, of the vehicle of a composition of the invention. In preferred compositions, the volatile solvent comprises 95 volume-percent or more of the vehicle.

The gel agent may be the only non-volatile material in the vehicle of a coating composition of the invention, in which case it serves as the binder material adhering the retro-reflective elements in a dry mark together and to the substrate. Coating compositions of the invention in which the gel agent is the only non-volatile binder material exhibit reflection faster than coating compositions that include a significant amount of additional binder material, because the latter compositions form a thicker film over the retro-reflective elements as the vehicle shrinks in an applied mark, and because presence of the additional binder may retard solvent-evaporation. Another advantage of compositions that have no additional binder material is that presence of the additional binder material may make a mark less easily removed, so that the mark can be applied to textile fabrics, reusable fabric bags, and the like.

On the other hand, a coating composition that includes binder material in addition to the gel agent forms a mark of increased durability. Accordingly, a decision whether to include binder material in the vehicle of a composition of the invention in addition to gel agent requires balancing several considerations. Where instant reflectivity is desired and an applied mark need not last long, as in many automatic processing and sorting operations, the vehicle will include little if any binder material in addition to gel agent. Where instant retro-reflection is not important but use of a coating composition of the invention is desired because, for example, it holds its shape on a vertical surface or will mark an irregular surface, some additional binder material may be present in the composition. The additional binder material may be chosen from a wide range of useful film-forming binder materials, including typical paint binders. Even in compositions that include additional binder material, however, the proportion of gel agent will be sufficient to form a gel that will cause retro-reflective elements to be held in suspension in the vehicle. Generally the gel agent in a composition of the invention will comprise at least 25 volume-percent of the non-volatile portion of the vehicle in the composition. If fast retro-reflection is desired, the gel agent will generally comprise at least 50 volume-percent of the nonvolatile portion of the vehicle, and where the fastest possible reflectivity is desired, the vehicle will preferably include substantially no non-volatile binder material in addition to the gel agent.

The retro-reflective elements in a composition of the invention are preferably transparent glass beads between 10 and 150 microns in diameter that have been hemispherically coated with a light-reflective material. Although these coated beads are oriented randomly in an applied mark, a sufficient number of the beads have their uncoated surfaces directed toward the light source to provide a good return of light toward the source. Uncoated glass beads are also useful, though a reflective pigment such as metal flake or powder is than preferably included in the vehicle to provide a light-reflective layer around the back of protruding beads. Generally coating compositions of the invention are free of non-reflective pigments and other inorganic filler materials. Another useful retro-reflective element is aggregate of glass beads such as described in U.S. Pat. No. 3,043,196.

To obtain a fast and good reflectivity, the retro-reflective elements are included in the compositions in a high "bead volume concentration" (EVC; the ratio of the volume of retro-reflective elements to the volume of all non-volatiles in the composition multiplied by 100). Preferably, the BVC in a composition of the invention is at least 90, though adequate reflectivity can be obtained if the BVC is at least 50. Since most marks made by compositions of the invention are only temporary, very little gel agent or other binder material need be included, and, in fact, the BVC can be substantially over 99.

The invention is further illustrated by the following examples:

EXAMPLES 1–3

Coating compositions were prepared having formulations as indicated in the table below. Each of the formulations used a different gel agent: a high-molecular-weight carboxyl-terminated vinyl polymer (Carbapol 934 manufactured by B.F. Goodrich Chemical Corp.) in Example 1, a derivative of hydroxy-propyl methyl cellulose (Methocel HG60 manufactured by Dow Chemical Co.) in Example 2, and an organic derivative of magnesium montmorillonite (Bentone 27 manufactured by National Lead Company) in Example 3. Each of the formulations was prepared by first mixing the gel agent in the solvent (with heat in the case of the Methocel) until the gel agent was dispersed in the solvent. The glass beads were 1.9-index beads, hemispherically coated with aluminum, and in a size range of 10–50 microns. The proportions in the table are in volume amounts.

| Example No. | 1 | 2 | 3 |
| --- | --- | --- | --- |
| Methanol | 38.4 | 75.5 | |
| Methyl ethyl ketone | 37.3 | | 70.0 |
| Isophorone | | | 6.3 |
| Gel agent | 1.1 | 1.7 | 1.7 |
| Glass beads | 23.2 | 22.8 | 22.0 |

The reflection characteristics of a mark of the coating composition of each of the examples formed by dropping a ⅛ inch diameter globule of the material two inches to a hard nonporous substrate was then measured. Typically, the vehicle in a coating composition of the invention is gelled sufficiently so that a globule dropped in this manner will form a shape-retaining mound having a height that is about one-tenth or more of the free-falling diameter of the globule (before evaporation of solvent). In the present case the height of the mounds was over one-fifth of the free-falling diameter of the globule. The reflection characteristics measured included time to actuate a photoscanner set at a sensitivity value typically used in industry (an Appalachian Electronic Instruments Linescan Photoscanner having a Detector Head Model No. P.N 6076-10, set at a sensitivity setting of 5) and the luminance factor (number of times that an applied dry mark is brighter than a perfectly diffuse white surface). Removability of the mark in water was tested by stirring a wooden stick carrying a dried mark of the composition in a beaker filled with water. The results were as follows:

| Example No. | 1 | 2 | 3 |
| --- | --- | --- | --- |
| Reflection Time, seconds | 20 | 15 | 10 |
| Luminance Factor | 240 | 140 | 90 |
| Water Rinse Removability | Yes | Yes | No |

Generally retro-reflective code marks will be formed by somewhat forcefully ejecting coating compositions of the invention from an applicator, and as a result the time to actuate a photoscanner will be substantially shorter than the times reported in the table. For example, the composition of Example 1 when applied through a 26-mil-diameter orifice under a pressure of 25 psi to a substrate two inches from the applicator actuated a photoscanner set at a medium sensitivity setting in about one second.

EXAMPLE 4

This example illustrates a coating composition of the invention like that of Example 1, but including a film-forming binder material in addition to the gel agent. The film-forming binder material was wood rosin (a naturally occurring resin chiefly comprising resin acids of the abietic and pimaric types, having the general formula $C_{19}H_{29}COOH$ and having a phenanthrene nucleus; by Hercules, Inc.). The composition was prepared by first dissolving the wood rosin in the solvent and then completing the composition in the manner described for Examples 1–3. The formulation was as follows:

| | Parts by volume |
| --- | --- |
| Methanol | 74.7 |
| Carbopol 934 | 1.1 |
| Wood rosin | 1.1 |
| Hemispherically coated glass beads | 23.1 |

When tested in the manner described for Examples 1–3, a mark of a coating composition of this example had a luminance factor of 80 and required 90 seconds to actuate the photoscanner. However, a mark of this composition will actuate a photoscanner in less than a minute if the composition is ejected under pressure through a nozzle as described in Examples 1–3 or if the photoscanner is set to a more sensitive value. Also, compositions of this example in which the gel agent comprise about 75 volume-percent of the non-volatile portion of the vehicle instead of 50 volume-percent as in this example, provide reflection in the test of this example in substantially less than a minute. Such a composition offers a good compromise between fast reflection and durability.

EXAMPLE 5

A composition like that of Example 1 was prepared except that uncoated glass beads were used and a paste of aluminum pigment (65 weight-percent-solids dispersion of fine aluminum pigment that passes a 325-mesh screen in mineral spirits) was added to the composition in a volume amount of 2.4 volume-percent. This composition yielded a luminance factor that was about 40 percent of that obtained with the composition of Example 1.

EXAMPLE 6

A coating composition of the invention was prepared using water as the solvent. The formulation was

| | Parts by volume |
| --- | --- |
| Water | 74 |
| Carbopol 934 | 1.2 |
| Hemispherically coated glass beads | 24.8 |

This composition formed satisfactory retro-reflective marks after several minutes.

What is claimed is:

1. A coating composition useful, inter alia, to form mound-shaped retroreflective marks that rapidly actuate photoscanner sensing devices, the composition comprising
   (1) a liquid vehicle that includes
      (a) a volatile solvent that accounts for at least 90 volume-percent of the vehicle, and
      (b) a gel agent that when mixed in an amount of less than about 10 volume parts per 100 parts of said solvent forms a gel that will support minute discrete retroreflective elements in a dispersed condition throughout the whole thickness of an applied mark of the gel, said gel agent being included in the vehicle in an amount sufficient to form such a gel and accounting for at least 50 volume-percent of all non-volatile binder material present in the vehicle; and (2) minute discrete retroreflective elements, comprising transparent microspheres and associated specular light-reflecting means, suspended in the vehicle in an amount of at least 50 volume-percent of all non-volatile material in the composition;

whereby, the composition may be applied to a surface as a mound-shaped mark, and a portion of the retroreflective elements within the composition will be supported and become optically exposed at the mound-shaped exterior surface of the mark.

2. A coating composition of claim 1 in which at least a major part of the volatile solvent has an evaporation rate of at least 200.

3. A coating composition of claim 1 in which the vehicle includes substantially no non-volatile binder material in addition to the gel agent.

4. A coating composition of claim 1 in which the retroreflective elements are glass beads hemispherically coated with a light-reflective material.

5. A coating composition useful, inter alia, to form mound-shaped retroreflective marks that rapidly actuate photoscanner sensing devices, the composition comprising (1) a liquid vehicle that includes
 (a) a volatile solvent that accounts for at least 95 volume-percent of the vehicle, and
 (b) a gel agent mixed in the solvent to form a gel that will support minute discrete retroreflective elements in a dispersed condition throughout the whole thickness of an applied mark of the gel, said gel agent accounting for at least 25 volume-percent of all non-volatile binder material present in the vehicle; and (2) transparent microspheres hemispherically coated with reflective material and suspended in the vehicle in an amount of at least 50 volume-percent of all non-volatile material in the composition;

whereby, the composition may be applied to a surface as a mound-shaped mark, and a portion of the retroreflective elements within the composition will be supported and become optically exposed at the mound-shaped exterior surface of the mark.

6. A coating composition of claim 5 which includes substantially no non-volatile binder material in the vehicle other than the gel agent.

7. A coating composition of claim 1 in which the volatile solvent accounts for at least 95 volume-percent of the vehicle and the vehicle includes substantially no non-volatile binder material other than the gel agent.

8. A coating composition of claim 5 in which the transparent microspheres account for at least 90 volume-percent of all non-volatile material in the composition.

9. A coating composition of claim 8 which includes substantially no non-volatile binder material in the vehicle other than the gel agent.

* * * * *